July 8, 1969  E. C. HENRIKSEN ET AL  3,454,714
FILM PROJECTOR AND TELEVISION CAMERA
Filed March 31, 1966  Sheet 1 of 2
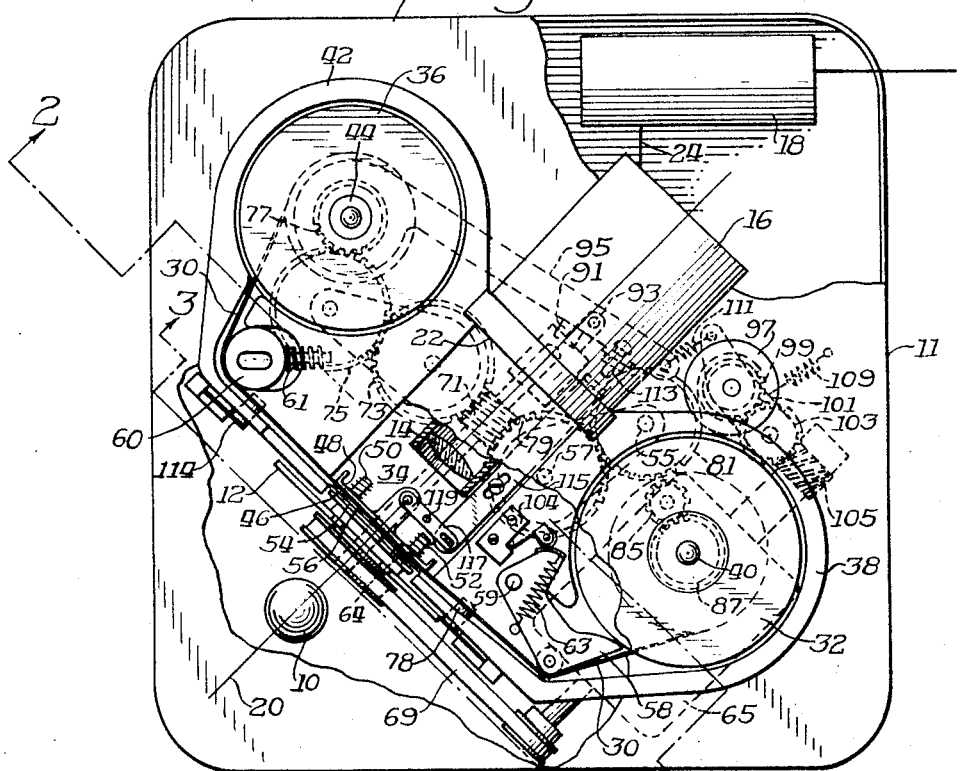
INVENTORS:
Elmer C. Henriksen,
James Reekie.
By Griffin and Branigan
Attys

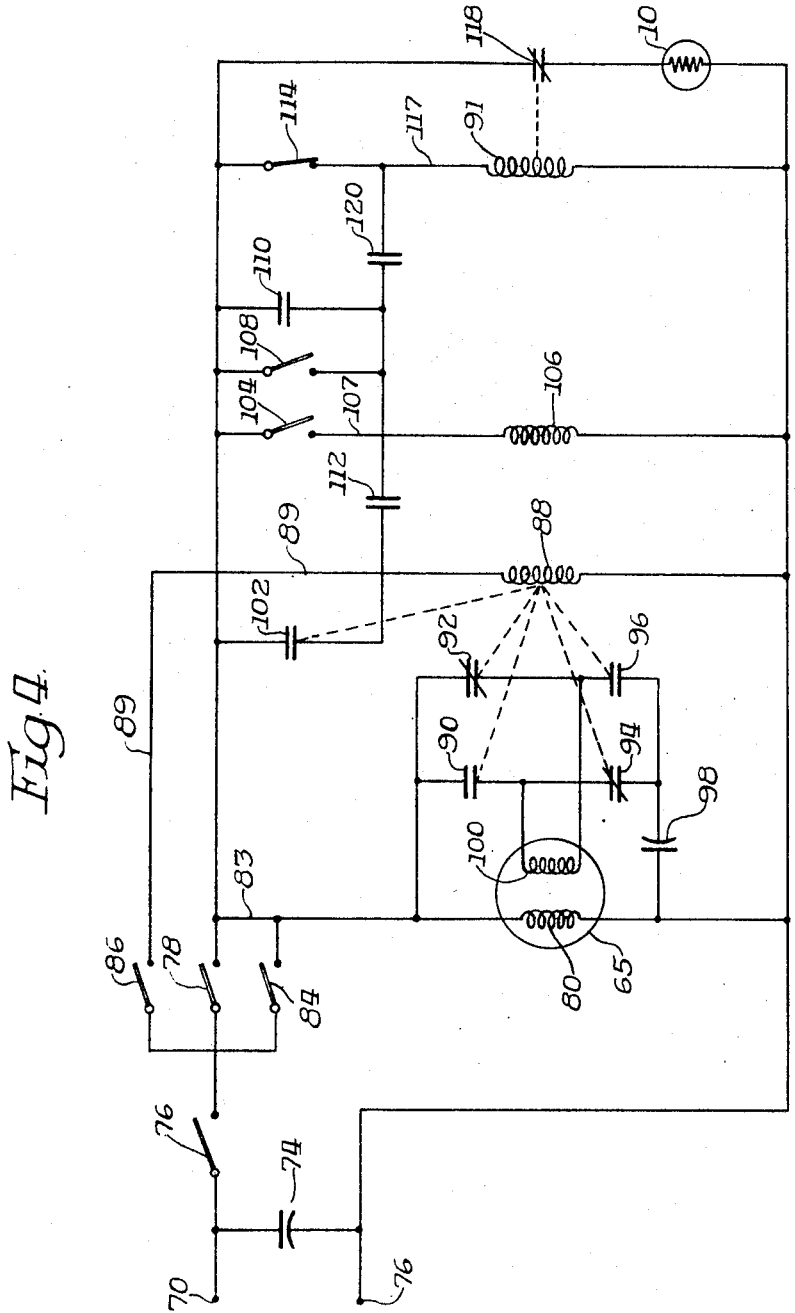

United States Patent Office 3,454,714
Patented July 8, 1969

3,454,714
FILM PROJECTOR AND TELEVISION CAMERA
Elmer C. Henriksen, Chicago, and James Reekie, Wilmette, Ill., assignors to Bell & Howell Company, Chicago, Ill., a corporation of Illinois
Filed Mar. 31, 1966, Ser. No. 539,057
Int. Cl. H04n 5/38
U.S. Cl. 178—7.2                                    11 Claims

ABSTRACT OF THE DISCLOSURE

This disclosure describes a compact film projector and TV camera that is suitable for displaying motion picture films on a television screen. The film moves in a horizontal plane from a film supply reel to a film take-up reel through a gate. A lamp is located on one side of the gate and a vidicon tube is located on the other side of the gate. A claw is provided for stopping the movement of the film when a picture is being displayed and shutter is provided for preventing light from passing through the film when the film is being moved. In addition, means are provided for automatically threading the film from the supply reel to film take-up reel.

This invention relates to projectors and more particularly to a portable projector for displaying domestic movie film on a television receiver.

In recent years widespread domestic use has been made of movie cameras for recording places and events on film for later display. The conventional display apparatus is a movie projector for projecting the film images onto a screen. These projectors have developed to the point of automatically threading the film through the projector; however, even with this sophisticated advance in the art, the home movie projector has several disadvantages. For example, previously developed automatic threading systems have required a plurality of sprocket, guard, and guide members to prevent misalignment and maladjustment. This requirement has resulted in a somewhat complicated apparatus. Further, prior art projectors have been lacking in compactness due to their vertical silhouette as well as the foregoing mechanical complexity. Moreover, a period of time is required to "set up" a prior art projector and screen assembly, thereby making this method of display somewhat inconvenient.

The prior art has recognized that is would be advantageous to provide a low silhouette movie projector wherein the movie film is moved in a horizonal plane as opposed to the more conventional vertical plane. Specifically, U.S. Patent 2,322,023 to Hopkins discloses such a system. However, even though that patent discloses a low silhouette projector which moves the film in a horizontal plane it utilizes a conventional film in projection means to do so and this results in a system having all of the aforementioned disadvantages. That is, the system still requires a plurality of sprocket, guard, and guide members to move the film through the optical projection axis. The Hopkins system has the further disadvantage of requiring a complicated optical prism and lens system for displaying an upright image.

It has long been recognized that movie film can be displayed on television receivers. Television stations regularly convert movie images into TV signals and transmit them for display on home television sets. Various systems have been developed for performing this function; however, they generally require bulky optical systems, complex electronic systems, and precision mechanical components. Accordingly, these systems have not found widespread use in the display of domestic movies on television receivers, but have been limited to use in TV stations having highly skilled employees to operate the rather complex equipment. Further, these systems have proved to be quite expensive making them objectionable for widespread domestic use. As exemplified by U.S. Patent 3,177,287 to Groak, the prior art has recognized that it would be desirable and advantageous to provide a system for displaying domestic movie film on home TV sets. However, that system, as well as other prior art systems, retain mainy of the previously discussed disadvantages relating to complexity and compactness. For example, the Groak system requires a complicated mechanical threading system including a plurality of sprockets and guides for alignment purposes. This makes for a complicated projector having all of the disadvantages of a conventional home movie display projector. In addition, the Groak device has a high and bulky silhouette due to film movement in the vertical plane.

Therefore, it is an object of this invention to provide a system for converting domestic movie film into TV signals for display on the display tube of a domestic TV receiver, said system being compact and uncomplicated and having a low silhouette.

It is also an object of this invention to provide a simple, compact projector for displaying movie film on the display tube of a TV receiver.

Another object of this invention is the provision of a simple projector for displaying movie film on the display tube of a TV receiver wherein the projector is simple to load, has a sprocketless automatic threading and rewind mechanism, and is of compact construction. The projector may be loaded and started by merely dropping a reel of film onto a spindle and closing a switch.

A further object of the invention is the provision of a portable projector for displaying movie film on the display tube of a TV receiver, the film in said projector being moved in a horizontal plane.

Still another object of the invention is the provision of a portable project which is easily loaded, automatically threaded and rewound, simple and compact in construction, and suitable for domestic use.

In accordance with a principle of the invention a means for displaying film images on the face of a vidicon tube is provided. This means includes a lamp, a shutter, and a lens all mounted along a projection axis that intersects the face of the vidicon tube. A feeding means is provided for moving a motion picture film across the projection axis. These elements are so oriented that light from the lamp passes through the shutter, the film and the lens with the film's image impinging on the face of the vidicon tube which produces signals that are converted for direct connection to a TV set. The feeding means includes a film supply reel and a film take-up reel mounted in a horizontal plane on opposite sides of the projection axis and in close proximity to the vidicon tube. This mounting provides for operation of the film in a horizontal plane as well as for compact construction. An additional means is provided for automatically threading the film from the film supply reel, through the projection axis, and onto the film take-up reel. All of the elements of the system are mounted in very close proximity resulting in an overall device approximately the size of a small tape recorder or portable record changer.

It will be appreciated that the device is simple, uncomplicated, and compact, making for a small system suitable for widespread domestic use. By moving the film in a horizontal plane ease of loading as well as the elimination of the sprockets, guards, and guide members of prior art devices is achieved. Further, operation of the film in a horizontal plane results in a much lower silhouette than is provided by presently avialable projection systems. Moreover, by displaying the film images on a TV set, the objectionable "set up" time of a conventional movie projector and screen system is eliminated.

The foregoing objects and many of the attendant advantages of the invention will become apparent upon consideration of the following description and the accompanying drawings wherein:

FIG. 1 is a pictorial top view of a preferred embodiment of the apparatus of the invention;

FIG. 2 is a sectional view along lines 2—2 of FIG. 1;

FIG. 3 is a sectional view along lines 3—3 of FIG. 1; and

FIG. 4 is a schematic diagram illustrating a preferred embodiment of the switching network of the automatic threading and rewind system of the invention.

Turning now to the drawings wherein like reference numerals indicate like parts, FIG. 1 illustrates a preferred embodiment of the invention and includes an electro-optical section for converting movie film images into electronic signals suitable for display on the display tube of a television set, and an electromechanical section for moving the film images through the electro-optical section. Both the electro-optical section and the electromechanical section are mounted in a housing 11. As shown in FIGS. 1 and 2, the housing has a vertical dimension which is substantially less than its dimensions in the horizontal plane thus giving the housing a low center of gravity.

The electro-optical section of the invention includes a lamp 10, a shutter 12, a lens 14, a vidicon tube 16, and an electronic control network 18. The lamp 10, the shutter 12, and the lens 14 are all mounted along an axis 20 which intersects, at a right angle, the face 22 of the vidicon tube 16. This arrangement focuses the film images (which pass, as hereinafter described, between the shutter and the lens) onto the face 22 of the vidicon tube. The electronic control network 18 is connected via a cable 24 to the vidicon tube 16. In a conventional manner the electronic control network 18 provides the scan electronics for the vidicon tube and also converts the signal output from the vidicon into a signal suitable for display on the display tube of a TV set.

The electro-mechanical portion of the invention is directed toward moving a film 30 in a horizontal plane through the axis 20 and includes a supply reel 32, a gate 34 for maintaining the film 30 at right angles to the axis 20, and a take-up reel 36. The supply reel 32 is manually placed in a well or recess 38 in housing 11 and revolves about a spindle 40. Similarly, the take-up reel 36 is mounted in a well or recess 42 and revolves about a spindle 44. For maximum compactness the vidicon tube is positioned diagonally in housing 11 with the supply and take-up reels being positioned on either side and in close proximity to the vidicon tube.

The gate 34 is mounted between the shuttle 12 and the lens 14 and includes a stationary plate 46 and a pressure plate 48 both mounted at right angles to the axis 20. The pressure plate 48 is normally urged toward the stationary plate 46 by a pair of compression springs 50 and 52. Further, an aperture 54 along the axis 20 is provided in the stationary plate 46 thereby allowing light from the lamp 10 to pass through said stationary plate. Similarly, an aperture 56 is provided in the pressure plate 48 where said pressure plate intersects the axis 20. The film 30 passes between the stationary plate 46 and the pressure plate 48 so that the apertures allow light to pass through the film. Hence, the stationary and pressure plates cooperate to form a conventional gate. Further a claw 64 is mounted between the gate apertures and the supply reel to move the film as hereinafter described.

Mounted between the supply reel 32 and the gate 34 is a buffer arm 58. The buffer arm is adapted to provide pressure against the film 30, as the film passes between the pressure and stationary plates, to prevent dislocation of the film due to buckling or other effects and to distribute tension loads along the film length. A snubber roller 60 is mounted between the take-up reel 36 and the gate 34. The snubber roller 60 is biased by, for example, a spring 61 against the film 30. This spring bias allows the snubber roller to move in response to film tension for purposes hereinafter described.

Preferably, the shutter 12 is a four bladed construction with the blades adapted to revolve through the axis 20. It will be appreciated, by those skilled in the art, that a four-bladed shutter operated in conjunction with a film movement of 15 frames per second results in synchronism with standard television operation of 60 scans or 30 pictures per second.

Except for the fact that a four-bladed rotating shutter is employed, the shutter 12 and claw 64 cooperate in a manner similar to the shutter and claw elements of conventional moving picture projectors. That is, the shutter 12 blocks the light from source 10 so that it does not pass through the film while the film is being advanced by the claw from one film frame to the next. When a film frame is brought by the claw into position for projection the shutter revolves so that light from source 10 may pass through the film to project the film image on the face of the vidicon tube.

The synchronism between the claw and shutter allows one frame at a time to be registered between apertures 54 and 56 of the film gate so that the image of one film frame at a time is projected as a steady or fixed image on the face of the vidicon tube. As the image of each frame is projected on the face of the vidicon tube it is scanned by the scanning beam of the tube to produce a video signal which may be displayed on the display tube of a conventional television receiver.

A feature of the invention is the manner in which the image on the face of the vidicon tube is scanned by the electron scanning beam of the tube. It is conventional practice to have the scanning beam scan the face of the tube during a series of sequential horizontal scans. Since the film is fed in a horizontal rather than a vertical plane this would result in a "tilted" picture on the face of the display tube in the television receiver. That is, what are normally considered as the top and bottom of a scene would appear at the right and left sides of the television screen and what are normally considered the right and left sides of a scene would appear at the top and the bottom of the television screen. To eliminate this condition, the scanning beam deflection control coils of the vidicon tube are rotated 90° about the optical axis of the tube and mounted in housing 11 in this rotated position. With the deflection coils positioned in this manner the scanning beam scans in a series of sequential vertical scans (as the vidicon tube is viewed in FIG. 2). However, since the path of the film is rotated 90° from its usual vertical plane the resultant output of the vidicon tube is the same as if a normally positioned tube and a vertical film feed path were being used. It is this feature which permits the horizontal film feed path and the low silhouette of the device. The low silhouette carries with it the attendant advantage of a low center of gravity thus making the device more stable than conventional projectors and less likely to tip over when inadvertently shaken or jarred.

The biased snubber roller 60 is provided to prevent breakage of the film and still allow the take-up reel 36 to be driven at a constant speed. As the claw 64 operates to prevent movement of the film, the snubber roller 60 moves against the action of compression spring 61 to provide a shorter path between the gate 34 and the takeup reel 36. As the claw operates to allow movement of the film the bias on the snubber roller 60 moves the roller towards the film and creates a longer path thereby taking up slack. Therefore, the snubber roller 60 provides for both the intermittent movement of film through the gate and the continuous movement of the take-up reel 36. In a somewhat similar manner, the buffer arm 58 which is pivoted about a pivot 59 and spring biased by spring 63 regulates tension on the film between the gate and the supply reel.

FIG. 2 is a sectional view along lines 2—2 of FIG. 1 and FIG. 3 is a sectional view along lines 3—3 of FIG. 1. These figures further illustrate the simplicity, compactness, and low silhouette of the invention.

The power system for moving the film is shown in FIGS. 1–3 and includes a reversible motor 65, a shaft 66, a first gear train indicated generally at 67 for driving take-up reel 32, and a second gear train indicated generally at 68 for driving supply reel 36. The reversible motor drives a toothed belt 69 which in turn drives the shaft 66 and a worm gear 71 mounted thereon.

The first and second gear trains are both driven by the worm gear 71. The first gear train includes first gears 73 and 73' fixedly mounted on a common shaft, a second gear 75 driven by gear 73', and a third gear 77 mounted on the bottom of take-up reel spindle 44 and driven by gear 75. The arrangement is such that when motor 65 turns in the forward direction the take-up reel is driven in the forward or take-up direction and when the motor 65 turns in the reverse direction the take-up reel is driven in the reverse or rewind direction.

The second gear train includes a combination gear 79–79' driven by worm gear 71, a gear 81 driven by gear 79', a gear 85, and a gear 87 driven by gear 85 and mounted on the bottom of the supply reel spindle. The gear 81 is mounted on a pivot 55 which is carried by an arm which pivots the shaft 57 on which gear 79 is mounted. Therefore, the teeth of gears 79' and 81 always remain meshed. However, gear 81 meshes with and drives gear 85 only during rewind operations. A friction clutch arrangement (not illustrated) is provided such that the arm carrying pivot 55 moves in a counter-clockwise direction when gear 79 is driven in the forward direction and the arm moves in a clockwise direction when the gear 79 is being driven by the motor in the "rewind" direction.

FIG. 4 is a schematic diagram of a preferred embodiment of the control system for the automatic threading mechanism of the invention. A pair of input terminals 70 and 72 are adapted for connection to a source of AC power. Connected across the input terminals is a filter capacitor 74. Connected in series between the input terminals 70 and 72 are a power supply switch 76 and a supply reel switch 78, and these switches are in turn series connected to one winding 80 of the reversible motor 65 by a line 83. Connected in parallel with the supply reel switch 78 is a forward control switch 84. Connected in parallel with the series combination of the supply reel switch 78 and the first winding 80 of the reversible motor is a reverse control switch 86 and a first relay coil 88. A set of contacts operated by the first relay coil 88 has four of its individual contacts 90, 92, 94, 96 connected in a bridge relationship. The bridge is connected at opposing junctions and in series with a capacitor 98 across the first winding 80 of the reversible motor 65. The second winding 100 of the reversible motor is connected across the unconnected junctions of the bridge. One opposing set of contacts 92 and 94 of the bridge are normally closed and the other opposing set of contacts 90 and 96 of the bridge are normally open. By this interconnection the bridge determines the direction of current flowing through the second winding 100 and consequently the direction of revolution of the shaft of the motor 65. A fifth set of normally open contacts 102 of the first relay coil 88 is connected between lines 83 and 89 as shown.

Connected in parallel with the first winding 80 of the motor 65 is a microswitch 104 which is connected in series with a second relay coil 106 by a line 107. Microswitch 104 operates in response to a predetermined amount of film tension. Connected in parallel with the switch 104 is a rewind control switch 108; and also connected in parallel with the switch 104 is a first set of normally open contacts 110 of the second relay coil 106. Connected between lines 89 and 107 is a second set of normally open contacts 112 of the second relay coil 106 as shown.

Also connected in parallel with the first winding 80 of the motor 65 is a take-up reel microswitch 114 which is connected in series with a solenoid 91 by line 117. Further, a set of normally closed contacts 118 controlled by solenoid 91 is in series with the lamp 10; this series combination is connected in parallel with the first winding 80 of the reversible motor 65. Finally, a third set of normally open contacts 120 of the second relay coil 106 is connected between lines 107 and 117.

The supply reel switch 78 and the microswitch 104 are operated by the film as hereinafter described, and are normally open. The take-up reel switch 114 is also operated by the film; however, it is normally closed. The forward control switch 84, the reverse control switch 86, and the rewind control switch 108 are, preferably, manually operated normally-open pushbutton switches.

Turning now to a description of the operation of the automatic threading mechanism of the invention, initially, a supply reel of film 32 is drop loaded into its well 38. The power switch 76 and the forward control switch 84 are closed. Closure of the forward control switch energizes the motor 65 and the solenoid 91.

As shown in FIG. 1, the armature 93 of the solenoid 91 is connected at one end to an arm 95. One end of arm 95 is mounted to freely pivot about the spindle 44 of the take-up reel 36. The other end of arm 95 is linked by a spring 111 to a second arm 97. Mounted on the arm 97 is a gear 99 and a friction roller 101 both of which are affixed to the same shaft so that the roller rotates with the gear. Gear 99 is driven by means of a gear 103 and a worm gear 105; the worm gear being mounted on one end of the shaft of drive motor 65. Further roller 101 is mounted in a plane with the supply reel 32 and adapted to press against the supply reel when the third solenoid is energized. A bias spring 109 is attached to the arm 97 to hold the roller away from engagement with the supply reel when the third solenoid is not energized.

Thus, when the solenoid 91 is energized its armature pivots the arm 95 which in turn pivots the arm 97 and brings the roller 101 into engagement with the supply reel 32. The drive motor now drives the supply reel through the worm gear 105, the gears 103 and 99 and the roller 101 to feed the film from the supply reel.

When solenoid 91 is energized it also opens the gate. An adjustable stop 113 on arm 95 moves a sliding linkage 115. The linkage 115 is connected to a further linkage 117 which is pivoted at 119 and connected at one end to the pressure plate 48. This linkage moves the pressure plate 48 away form stationary plate 46 so that the approaching end of the film will move freely through the gate.

Located between the buffer arm 58 and the gate 34 is the supply reel micro switch 78 which closes as the film moves past it. The closure of the supply reel switch 78 provides a second energization path for the motor 65 and the solenoid 91 and allows the forward control switch 84 to be released. After passing between the plates 46 and 48 the film moves past the snubber roller 60 and winds above the hub of the revolving take-up reel 68 which is revolved at a higher speed than the supply reel 32 by means of the gearing combinations illustrated. The take-up reel microswitch 114 is located on the film path between gate 34 and snubber roller 60. The take-up reel switch 114 is activated by the film edge. As seen in FIG. 4, this de-energizes the solenoid 91 to close the film gate, moves the friction roller 101 away from delivery reel 32, and allows power to energize the lamp 10. As the film edge passes microswitch 114, the solenoid 91 is de-energized, closing the film gate. The film then continues to feed past the snubber and into the takeup reel. As the film winds about the hub it soon becomes attached thereto and because of the speed differential between the two reels the film is brought under tension. This tension allows the take-up reel to now pull the film through the mechanism. The invention now assumes its conventional picture display mode as has been previously described.

The film is permanently attached to the spindle 40 of the supply reel 32. Hence, when it reaches the end of its run sufficient tension is placed on the film to pivot buffer arm 58 and close the tension microswitch 104. Closure of this switch energizes the second relay coil 106 closing its three sets of contacts 110, 112, and 120. Closure of contacts 112 energize the first relay coil 88. The switching of the contacts of relay 88 reverses current to the second winding of the motor 65 thus causing a reversal of the direction of movement of the motor shaft thereby moving the gear 81 into engagement with the gear 85. This movement applies reverse power to the supply reel causing the film to be rewound onto the supply reel. Closure of contacts 110 and 120 energize solenoid 91 to open the gate during rewind. The contacts 118 associated with solenoid 91 are opened to remove power from the lamp 10. As the end of the film moves past the supply reel switch 78 the switch is opened, the motor is de-energized, and the system comes to a rest condition.

The rewind control switch 108 is provided for a manual momentary or continuous rewind at any time during the projection mode and causes the same rewind action as occurs when switch 104 is closed at the end of a reel.

It will be appreciated that the invention comprises a simple mechanism in which film can be easily drop loaded and automatically threaded through a similarly uncomplicated structure. Further, the invention results in a small compact mechanism which is only about the size of a portable tape recorder or record changer. Moreover, because a four bladed shutter is used with a film speed of 15 frames per second the system's image projection rate is wholly compatible with the 60 fields per second or 30 frames per second scan rate of commercial TV sets. Conventional 8 mm. movie film moves through a projector at 16–18 frames per second; however, it has been found that 15 frames per second is quite acceptable for projection on a TV set without resulting in flicker or other undesirable characteristics. Hence, the system is adapted to display motion picture film directly onto home TV sets.

Even though the invention has been described as primarily useful for home movie display, it will be appreciated that it is equally useful in other environments. For example, it can be used to display educational movies on TV sets located in school classrooms. In addition, the invention may be connected to one or several TV sets located in one or more classrooms thereby providing a very flexible and convenient display system.

The embodiments of the invention in which an exclusive property or privilege is claimed are defined as follows:

1. Portable apparatus for converting pictures from a moving picture film into electronic signals suitable for direct application to a television receiver comprising:
   a vidicon tube;
   means for displaying a film image on the face of said vidicon tube including a lamp, a shutter, and a lens all mounted along an axis that intersects the face of said vidicon tube so that light from the lamp passes through the shutter and the lens and impinges on the face of the vidicon tube;
   means for converting the signal output from said vidicon tube to a television signal suitable for direct application to a television receiver;
   film moving means for horizontally moving a motion picture film through said axis, at right angles thereto, including a film supply reel and a film take-up reel mounted in a horizontal plane on opposite sides of said axis and in close proximity to said vidicon tube; and
   said film moving means including a claw for stopping the movement of said motion picture film during an open shutter period so that a steady image is received by said vidicon tube.

2. Apparatus as claimed in claim 1 including means for automatically threading the film from said film supply reel, past said claw, and onto said film take-up reel.

3. Apparatus as claimed in claim 2 including:
   a snubber roller located between said claw and said film take-up reel; and
   a buffer arm located between said claw and said supply reel.

4. Apparatus as claimed in claim 3 wherein said film moving means includes a gate, said gate including a stationary plate and a pressure plate.

5. Apparatus as claimed in claim 4 wherein said means for automatically threading the film comprises:
   means for providing an open path between said film supply reel and said film take-up reel including means for moving said pressure plate away from said stationary plate;
   means for revolving said film supply reel thereby moving film from said supply reel through said open path to said film take-up reel; and
   drive means for revolving said film take-up reel at a speed faster than said film delivery reel whereby the moving film wraps about the spindle of said film take-up reel becoming tightly affixed thereto.

6. Apparatus as claimed in claim 5 including means for stopping said means for revolving said film supply reel after said film has become affixed to the spindle of said film take-up reel.

7. Apparatus as claimed in claim 6 including means for moving said pressure plate into its normal operating position after said film has become affixed to the spindle of said film take-up reel.

8. Apparatus as claimed in claim 7 including a housing wherein all of said elements are mounted in close proximity.

9. Apparatus as claimed in claim 8 including means for automatically rewinding the film.

10. A converter for converting images on a motion picture film to electronic signals suitable for direct application to a television receiver, said converter comprising:
    a housing having a vertical dimension substantially less than second and third dimensions, said second and third dimensions being in a horizontal plane,
    a vidicon tube within said housing and including an electron scanning beam for producing video output signals representing optical images projected onto the face of said tube,
    said vidicon tube being disposed whereby its optical axis is in said horizontal plane and is substantially diagonally disposed with respect to the second and third dimensions of said housing;
    deflection means within said housing for repetitively deflecting said electron scanning beam in a substantially vertical direction with respect to said horizontal plane to thereby scan optical images on the face of said vidicon tube in a series of vertical scans,
    a supply reel and a take-up reel for moving film in said horizontal plane and through said optical axis, and
    a light source and a shutter disposed within said housing and on said optical axis whereby light from said source passes through said shutter and said film to project optical images on the face of said vidicon tube.

11. A converter as claimed in claim 10 and further comprising:
    an open well in the top of said housing for receiving said supply reel, a spindle extending upwardly through the bottom of said well, and automatic threading means responsive to closure of a switch for driving said spindle and said take-up reel, whereby said converter may be placed in operation by dropping said supply reel onto said spindle and closing said switch.

References Cited

RCA, Closed Circuit Television Systems, Book I, pp. 108–109 (1958).

ROBERT L. GRIFFIN, *Primary Examiner.*

R. L. RICHARDSON, *Assistant Examiner.*